United States Patent

[11] 3,595,453

[72] Inventor Jeffrey R. Sherry
    Danbury, Conn.
[21] Appl. No. 872,916
[22] Filed Oct. 31, 1969
[45] Patented July 27, 1971
[73] Assignee Branson Instruments, Incorporation
    Stamford, Conn.
    Continuation-in-part of application Ser. No. 865,382, Oct. 10, 1969, now abandoned.

[54] METHOD OF SEPARATING PARTS USING HIGH FREQUENCY ENERGY
    4 Claims, 6 Drawing Figs.
[52] U.S. Cl. .................................................. 225/1,
    225/93, 264/23

[51] Int. Cl. .................................................. B26f 3/00
[50] Field of Search .................................................. 225/1, 93;
    264/23, 161, 344; 228/1; 146/2

[56] References Cited
    UNITED STATES PATENTS
    3,157,329  11/1964  DeGorter .................. 225/93
    3,172,588  3/1965   Bertold et al. ............ 225/93
    3,446,407  5/1969   Dawson ..................... 225/93 X Primary Examiner—Frank T. Yost
Attorney—Ervin B. Steinberg ABSTRACT: Molded parts connected to a runner are separated from the runner by applying energy in the sonic or ultrasonic frequency range to a portion of the runner or the parts.

INVENTOR.
JEFFREY R. SHERRY

INVENTOR.
JEFFREY R. SHERRY
BY
Ervin B. Steinberg

METHOD OF SEPARATING PARTS USING HIGH FREQUENCY ENERGY

This application is a continuation-in-part of copending application for U.S. Letters Patent Ser. No. 865,382, filed Oct. 10, 1969 now abandoned.

This invention refers to a method of separating molded parts using sonic energy and, more specifically, has reference to a method of separating molded parts from a runner using high frequency sonic or ultrasonic energy. Quite specifically, in one embodiment this invention refers to a method of separating molded thermoplastic parts from a runner which is connected to the molded parts by individual gates, using acoustic energy in the high frequency sonic or ultrasonic frequency range for burning out the gates so as to separate the molded parts from the runner. In another embodiment, this invention refers to a method of separating a nonthermoplastic part, such as a metallic part, from associated gates and removing also flashing.

In molding thermoplastic parts, it is common practice to mold simultaneously a plurality of thermoplastic parts which are joined to a runner by means of individual gates. After the molding operation has been completed, the entire assembly comprising one or more runners and the plurality of attached parts is removed from the mold and the individual parts are disconnected from the runners. This process is known also as "degating." The degating, generally a manual operation, results in a scar on the molded part and such scar may have to smoothed off using a mechanical abrading or polishing process. With regard to the technique of molding thermoplastic parts, using runners and gates, and the degating process reference is made to "Plastics Engineering Handbook," Third Edition, Reinhold Publishing Corporation, New York, N. Y. third printing 1964, LIbrary of Congress Catalog Card No. 60–8081, particularly pages 46, 50, 413, 415 and 437.

In molding nonthermoplastic parts, particularly metallic parts, gates are used to conduct metal into the mold cavity. The molded part must be separated from the gates and flashing produced by mold separation must be removed also to provide the finished usable part. With regard to gates used in casting metal parts reference is made to "Casting Design Handbook," published by The American Society for Metals, Metals Park, Ohio, 1962 edition.

The present invention concerns a method whereby a simpler and substantially faster degating process is obtained. Specifically, a plurality of thermoplastic molded parts can be degated simultaneously by subjecting the assembly to high frequency sonic or ultrasonic energy and, responsive to the dissipation of such energy, the respective gates are burned out, leaving a smooth finish. This process obviates the need for mechanical smoothing.

One of the principal objects of this invention, therefore, is the provision of a new and improved method for separating a molded part from a runner or gate, eliminating one or more of the limitations and disadvantages of the prior art arrangements.

Another important object of this invention is the provision of a new and improved method of separating or degating molded thermoplastic parts from a runner.

A further important object of this invention is the provision of a method of separating a molded thermoplastic or metallic part from a runner or gate using high frequency sonic or ultrasonic energy.

A still further and other object of this invention is the provision of a new and improved method of separating molded thermoplastic parts from a runner by high frequency sonic energy of sufficient amplitude and power to cause the gates which connect the molded parts to the runner to burn out, leaving a smooth surface.

Further and still another object of this invention will be more clearly apparent with reference to the following description when taken in conjunction with the accompanying drawings in which.

Figure 1:
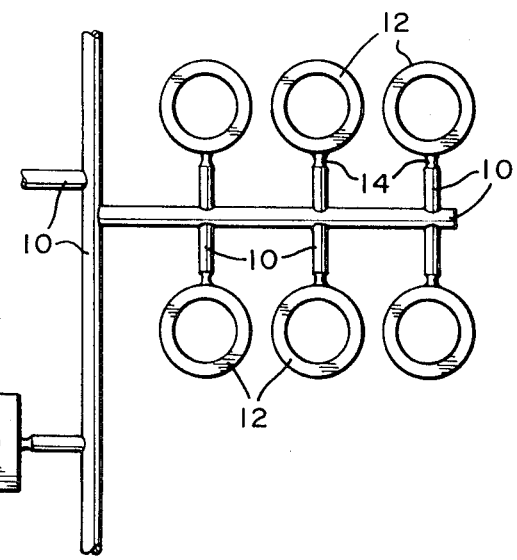
FIG. 1 is a plan view of a typical assembly of thermoplastic parts showing a runner, gates and molded parts.
Figure 2:
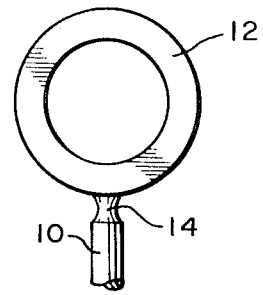
FIG. 2 is an enlarged view of a portion of FIG. 1.

Referring now to the figures and FIGS. 1 and 2 in particular, there is shown a molded assembly having one or more full round runners 10 and a plurality of molded parts or workpieces 12. Each part 12 is joined to a runner 10 by an individual gate 14. The design of runners and gates is well known and described in detail in the handbook referenced above. In a typical case, the molded assembly is thermoplastic material, such as nylon. Normally each part 12 is broken off from the runner and the resulting scar left, all or a portion of the gate 14, is smoothed by a mechanical polishing operation. This, of course, necessitates individual handling of each part.

Figure 3:
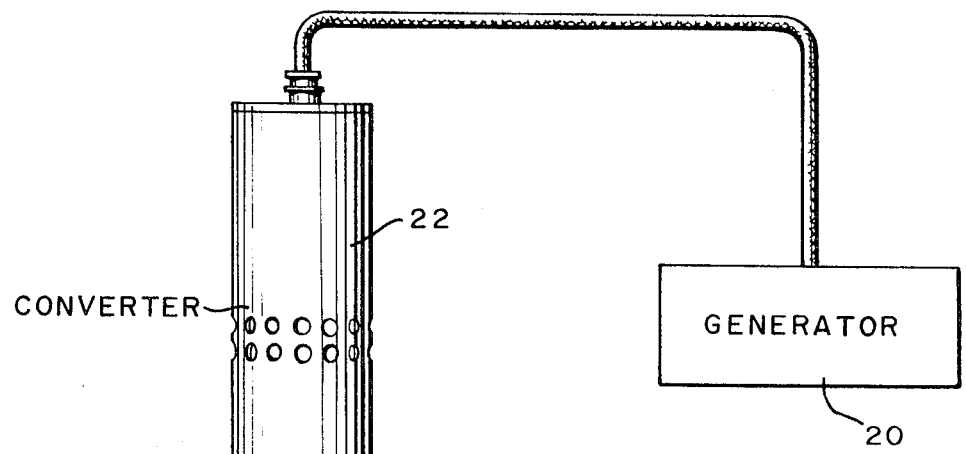
FIG. 3 is a schematic illustration showing the apparatus and method of separating or degating molded parts from a runner.
Figure 3:
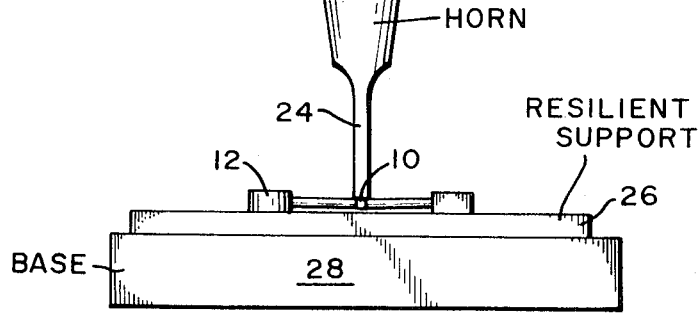

The improved arrangement is shown in FIG. 3. High frequency energy in the sonic or ultrasonic frequency range is applied to the assembly and, if of sufficient motional amplitude and power, the dissipation of sonic energy in the gates softens and burns out the gates, leaving the surface of the parts 12 completely smooth and without scar. Apparently the thin gates are heated by the dissipation of sonic energy, causing a softening and possibly a partial vaporization of the thermoplastic material. In any event, there is an absence of a scar and subsequent polishing is unnecessary. As used herein the term "high frequncy" shall denote energy in the range from 1 kHz. upward.

As seen in FIG. 3, an electrical high frequency generator 20 energizes a converter 22 which converts the applied electrical energy to vibrations in the sonic or ultrasonic frequency range. To this end, the converter 22 is provided with magnetostrictive or piezoelectric means (not shown). A typical converter suitable for this purpose is shown in U.S. Pat. No. 3,328,610 entitled "Sonic Wave Generator," issued to S. E. Jacke et al., dated June 27, 1967.

The converter is fitted with a solid horn 24, also known as a velocity transformer or mechanical impedance transformer, which amplifies the mechanical amplitude of oscillation. In a typical example, the converter is fed with electrical energy at 20 kHz. and the horn provides at its output surface a mechanical amplitude of several thousandths of an inch. The assembly of thermoplastic parts is disposed on a resilient support layer 26, such as a rubber or cork mat, which rests on a base 28. The horn is brought and urged into contact with a portion of the runner 10, thereby acting as a tool for injecting ultrasonic energy into the assembly and causing the degating process to take place.

In a typical example, a molded nylon assembly having more than a dozen parts, each ranging from one-quarter to 1 inch across its longest dimension, was degated using a commercially available type J-32 power supply and converter assembly made by Branson Sonic Power Company of Danbury, Connecticut. This source of ultrasonic energy, operating at 20 kHz., is rated to produce 3,900 inch pounds per second. The horn 24 was a bar horn for contacting the runner over a length of 6 inches. Tests conducted indicate that the amplitude of oscillation appears to have a pronounced effect. It is believed that a large motional amplitude, typically 0.001 to 0.005 inch peak to peak, as can be achieved for instance by the use of a high gain or an intermediate booster horn, contributes significantly to rapid fatigue and heat failure of the gate. In the typical example, degating was accomplished by contacting the runner for a period of less than 1 second. After degating has occurred, prolonged contact between the tool and runner has no adverse effect upon the parts since the latter are decoupled from the sonic energy. The converter was moved into and out of contact with the runner 10 by a controlled mechanical reciprocating motion, using a Model 227 stand available from Branson supra. A similar stand for moving an ultrasonic energy source in a reciprocating motion is described also in U.S. Pat. No. 3,222,239 "Ultrasonic Sealing System," H. Deans, dated Dec. 7, 1965.

In another example the same arrangement was used to degate simultaneously six thermoplastic toothbrush handles. In all instances almost instantaneous degating is achieved.

The thermoplastic gates 14, for the sake of clarity, are shown exaggerated, however in actual practice these gates are relatively thin and short.

It will be apparent that this multiple and simultaneous degating of molded parts is not only extremely fast and more convenient than hand degating, but by eliminating the need for smoothing sharp burrs or edges normally remaining when forcibly breaking off the parts from the runner, a significant advance in the art is achieved.

Figure 4:
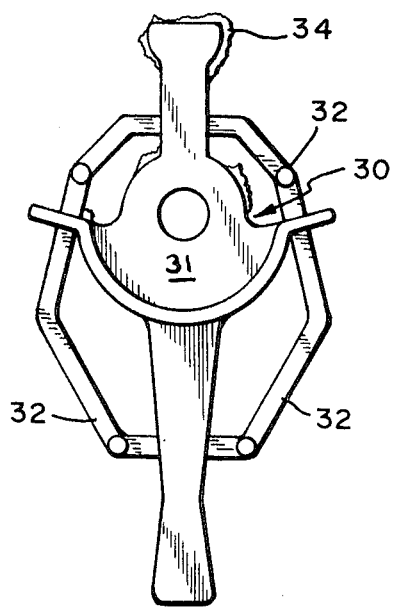
FIG. 4 is a plan view of molded metal part with gates still connected.
Figure 5:
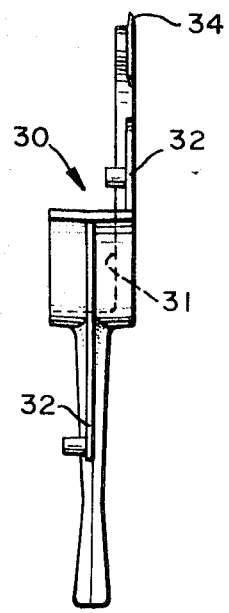
FIG. 5 is a side view of FIG. 4.
Figure 6:
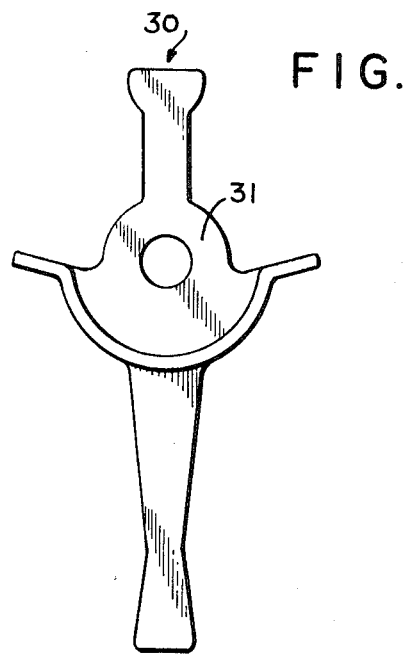
FIG. 6 is a plan view of the molded part after high frequency sonic treatment.

Referring now to FIGS. 4 and 5, a molded metal part 30 is shown, typically a part of a lock mechanism made of aluminum. The part is cast with a set of gates 32 following the teachings described in the Casting Design Handbook supra. Also the molded or cast part exhibits flashing 34 caused by the mold separation. The part has a maximum length dimension of 2 inches. Using the ultrasonic energy apparatus per FIG. 3 together with a cylindrical horn whose frontal output surface is urged into contact with the part 30 at the central surface 31, a degating occurs and also the flashing 34 is broken off to a pronounced degree, see FIG. 6. This process, as before, occurs in a fraction of a second and, it is believed, is the result of rapid fatiguing and localized heat in the area of high stress concentration, that is, the location at which the relatively thin gates are connected to the body of the metal part 30.

It will be seen, therefore, that the above-described process lends itself to a great variety of parts and materials and it shall be understood that the examples specifically described are merely illustrative of the novel process discovered.

What I claim is:

1. The method of separating a thermoplastic or similar molded part from a runner, said molded part being attached to the runner by a gate comprising:
   providing a source of ultrasonic energy, and coupling said source to a portion of said runner, and said source providing energy of sufficient motional amplitude and intensity to cause a softening and burnout of the gate to obtain a separation of the molded part from the runner.

2. The method of simultaneously degating a plurality of molded thermoplastic parts which are joined to a runner by respective gates comprising the steps of:
   disposing said parts while joined to the runner upon a base;
   providing a source of ultrasonic energy having a horn coupled thereto, the latter providing at an output surface thereof vibrations having a motional amplitude in the range from 0.001 to 0.005 inch peak to peak, and
   coupling said output surface to said runner whereby to subject said runner to ultrasonic energy of substantially large motional amplitude to cause a burnout of the respective gates and freeing said parts from connection to said runner.

3. The method of degating as set forth in claim 2, said base including resilient material.

4. The method of degating as set forth in claim 2, coupling said output surface to said runner comprising urging said output surface in contact with a portion of said runner.